(12) United States Patent
Bassi

US007175008B2

(10) Patent No.: US 7,175,008 B2
(45) Date of Patent: Feb. 13, 2007

(54) HIGH-RESISTANCE DECELERATING DEVICE, PARTICULARLY FOR INSERTION BETWEEN TWO MEMBERS IN RELATIVE MOTION

(75) Inventor: Alberto Bassi, Turin (IT)

(73) Assignee: ITW Industrial Components S.R.L., Milan (IT)

( * ) Notice: Subject to any disclaimer, the term of this patent is extended or adjusted under 35 U.S.C. 154(b) by 83 days.

(21) Appl. No.: 10/703,078

(22) Filed: Nov. 7, 2003

(65) Prior Publication Data

US 2005/0051399 A1    Mar. 10, 2005

(30) Foreign Application Priority Data

Nov. 8, 2002    (IT)    .............................. TO02A0966

(51) Int. Cl.
*F16F 9/14*    (2006.01)
(52) U.S. Cl. ...................................... 188/290; 188/293
(58) Field of Classification Search ................ 188/290, 188/293, 306–310, 291, 283, 316–317, 322.5, 188/130; 16/51, 58, 50, 54, 82, 308, 256, 16/285, 342, 295; 4/248; 74/473 F, 474; 464/24
See application file for complete search history.

(56) References Cited

U.S. PATENT DOCUMENTS

| | | | | |
|---|---|---|---|---|
| 1,273,011 A | * | 7/1918 | Snyder | .................... 188/283 |
| 1,341,395 A | * | 5/1920 | Sutton | .................... 188/288 |
| 1,567,515 A | * | 12/1925 | Kijima et al. | ................ 188/288 |
| 1,820,971 A | * | 9/1931 | Gruenfeldt | ................... 188/288 |
| 2,088,875 A | * | 8/1937 | Serste | ........................ 188/281 |
| 3,952,365 A | | 4/1976 | Grisebach | |
| 4,296,292 A | | 10/1981 | Schuberth et al. | |
| 4,723,639 A | | 2/1988 | Hungerford | |
| 5,064,033 A | * | 11/1991 | Koike et al. | ................. 188/306 |
| 5,390,770 A | | 2/1995 | Miyahara et al. | |
| 5,697,122 A | * | 12/1997 | Okabe et al. | ................... 16/82 |
| 5,720,370 A | * | 2/1998 | Takahashi | .................... 188/310 |
| 6,213,881 B1 | * | 4/2001 | Sasa et al. | ..................... 464/24 |

(Continued)

FOREIGN PATENT DOCUMENTS

DE    22 47 323    4/1973

(Continued)

OTHER PUBLICATIONS

Patent Abstracts of Japan, Publication No. 06193666, Jul. 15, 1994.

*Primary Examiner*—Christopher P. Schwartz
(74) *Attorney, Agent, or Firm*—Lowe Hauptman & Berner, LLP

(57) ABSTRACT

A decelerating device includes a casing defining internally a chamber filled with a viscous fluid, e.g. silicone oil; and a movable member fitted in fluidtight manner to the casing, so as to be housed at least partly inside the chamber and immersed in the viscous fluid. The movable member has a partition for dividing the chamber substantially in fluidtight manner into at least two adjacent portions varying in volume as a function of the position of the movable member with respect to the casing; and a calibrated constriction for maintaining permanent hydraulic connection of the at least two adjacent portions of the chamber, so that the viscous fluid flows between the chamber portions as a consequence of relative motion between the movable member and the casing.

18 Claims, 3 Drawing Sheets

U.S. PATENT DOCUMENTS

| | | | |
|---|---|---|---|
| 6,390,255 B2 * | 5/2002 | Kobori et al. | 188/290 |
| 6,604,614 B2 * | 8/2003 | Kurihara et al. | 188/290 |
| 6,662,683 B1 * | 12/2003 | Takahashi et al. | 74/573 F |
| 6,725,984 B2 * | 4/2004 | Orita | 188/290 |
| 2003/0140451 A1 * | 7/2003 | Bivens et al. | 16/54 |
| 2003/0150678 A1 * | 8/2003 | Iwashita | 188/296 |
| 2005/0051399 A1 * | 3/2005 | Bassi | 188/316 |

FOREIGN PATENT DOCUMENTS

| | | | |
|---|---|---|---|
| DE | 39 21 398 | | 1/1991 |
| EP | 000742381 A2 * | | 11/1996 |
| EP | 0 926 383 | | 6/1999 |
| EP | 001004791 A1 * | | 5/2000 |
| EP | 001418363 A1 * | | 5/2004 |
| JP | 10-169688 | * | 6/1988 |
| JP | 63-275824 | * | 11/1988 |
| JP | 2000-120748 | * | 4/2000 |
| JP | 2002-48126 | * | 2/2002 |
| JP | 2002-295561 | * | 10/2002 |
| JP | 2003-130115 | * | 5/2003 |

* cited by examiner

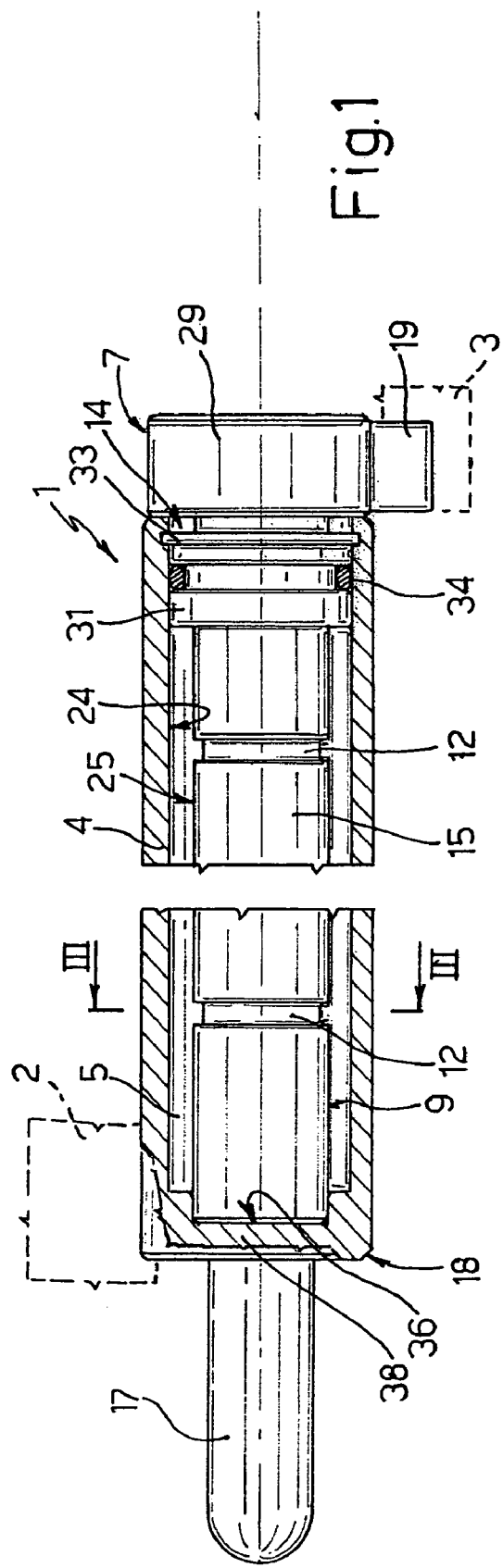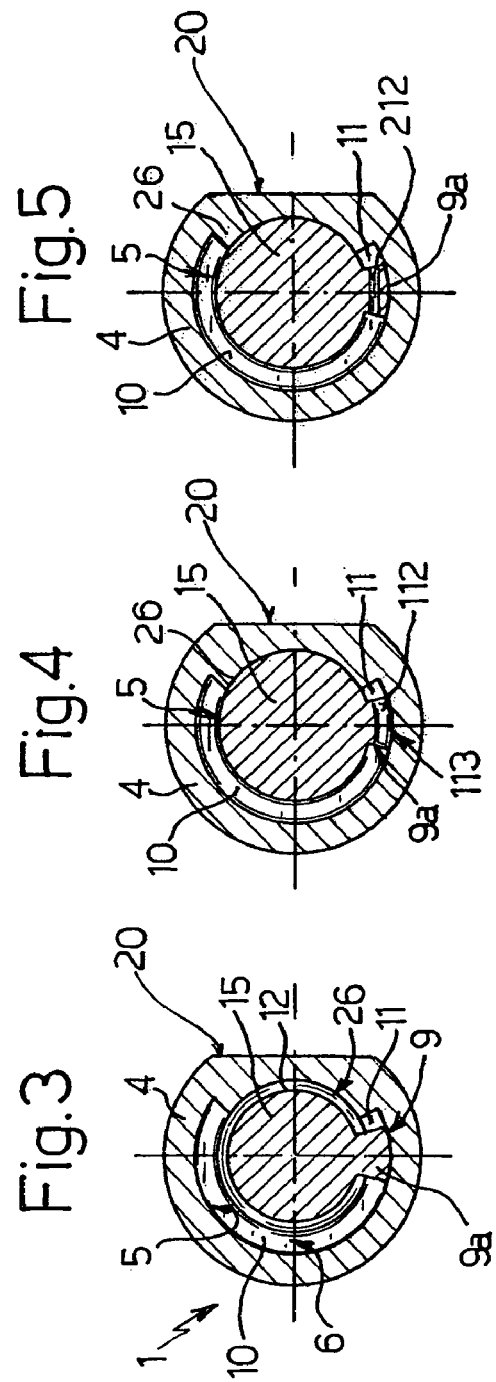

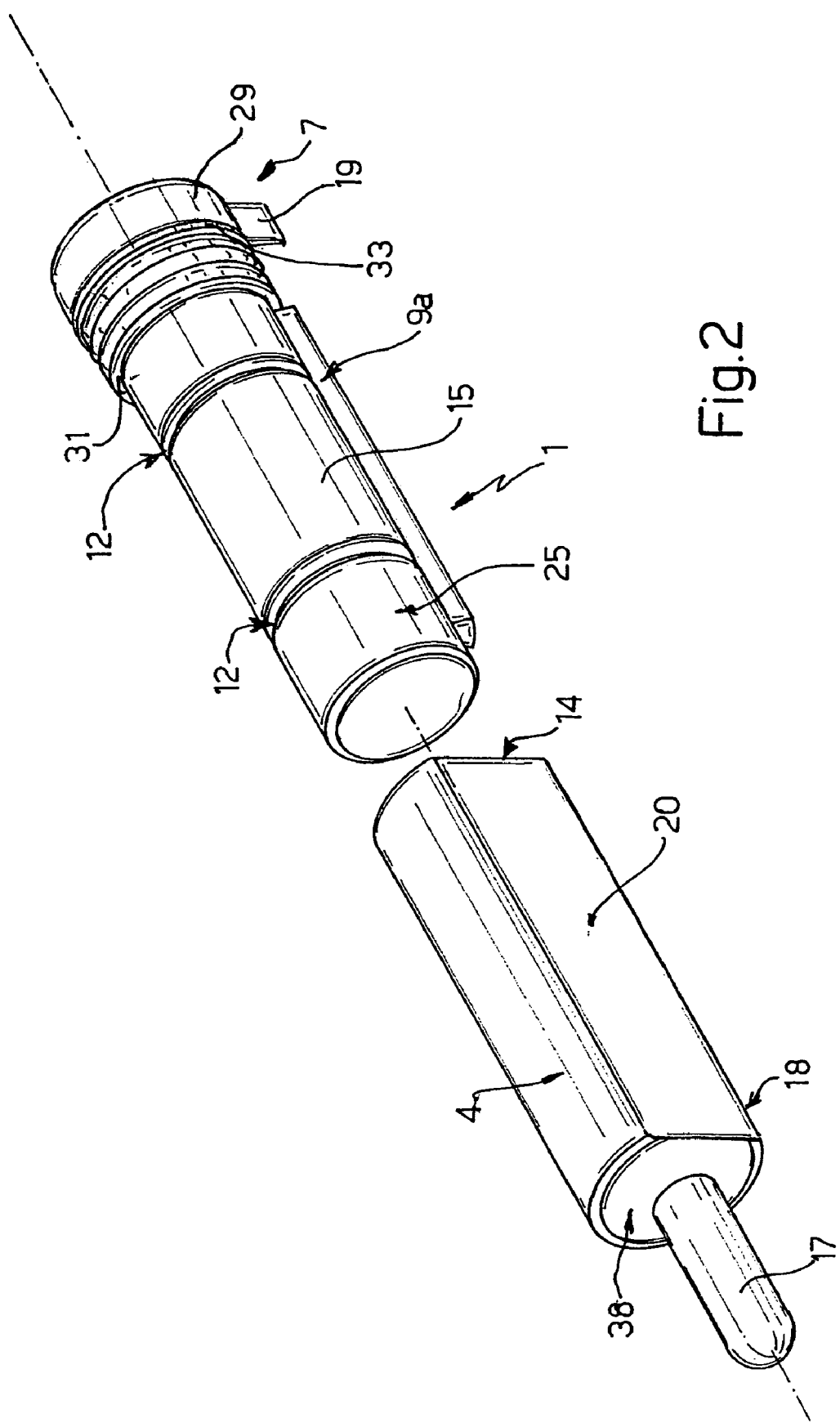

HIGH-RESISTANCE DECELERATING DEVICE, PARTICULARLY FOR INSERTION BETWEEN TWO MEMBERS IN RELATIVE MOTION

The present invention relates to a high-resistance decelerating device for insertion between two members in relative motion, e.g. by the action of a spring or gravity, and for considerably slowing down motion of the two members.

BACKGROUND OF THE INVENTION

As is known, in top-loaded washing machines, the drum has two doors fitted with spring-loaded hinges. When the closed doors are released, e.g. by pressing a button, springs push the doors open by rotating them radially; and, conversely, the open doors are pushed manually back into the closed position in opposition to the springs, which are thus reloaded elastically.

Since the doors would be opened fairly sharply, thus endangering the user, the opening movement must be damped by fitting the doors with decelerating devices.

Generally speaking, many applications, not only electric household appliances, but also automotive components (such as a glove compartment door), involve damping the movement of two members in relative motion—normally relative rotation but possibly also relative sliding motion.

Known decelerating devices normally comprise a rotor (e.g. in the form of a turbine), which rotates immersed in a viscous fluid inside a casing; and the rotor is secured to one of the rotating members, and the casing to the other. Though effective, this type of decelerating device is bulky, particularly radially, and in direct proportion to the amount of braking action required, and is therefore unsuitable for use in a hinge, particularly one of small radial dimensions as in the case of a top-loaded washing machine drum.

On the other hand, other known, more radially compact, decelerating devices simply comprise a rotating pin immersed in the viscous fluid, and therefore fail to generate a high braking torque.

SUMMARY OF THE INVENTION

It is an object of the present invention to eliminate the aforementioned drawbacks by providing a decelerating device which, despite being compact, particularly radially, is capable of generating considerable resistance, is straightforward in design, and is reliable and cheap to produce.

As it rotates inside the casing, the pin thus varies the volume of the two chamber portions (increases one and reduces the other) by virtue of the movement of the rib, rotating integrally with the pin, inside the chamber; while the saddle-shaped projection, by interrupting the annular continuity of the chamber, prevents the viscous fluid from being simply rotated by the movement of the rib. The viscous fluid (normally silicone oil) is thus forced to flow from one chamber portion (the one being reduced in volume) to the other through said at least one groove (or at least one hole formed through the rib), which thus acts as a calibrated resistance-generating constriction for producing even a relatively strong force (in this case, torque on the pin) opposing relative motion between the pin and casing.

BRIEF DESCRIPTION OF THE DRAWINGS

A non-limiting embodiment of the present invention will be described by way of example with reference to the accompanying drawings, in which:

FIG. 1 is a longitudinal section of a decelerating device in accordance with the invention and FIG. 6 is a fragmental view of FIG. 1 additionally showing torsion spring;

FIG. 2 shows a larger-scale, three-quarter front view in perspective of the FIG. 1 device with the main components detached;

FIG. 3 shows a section along line III—III of the FIG. 1 decelerating device;

FIGS. 4 and 5 show the same section as in FIG. 3, of two possible variations of the FIG. 1 decelerating device.

DETAILED DESCRIPTION OF THE INVENTION

Figure 6:
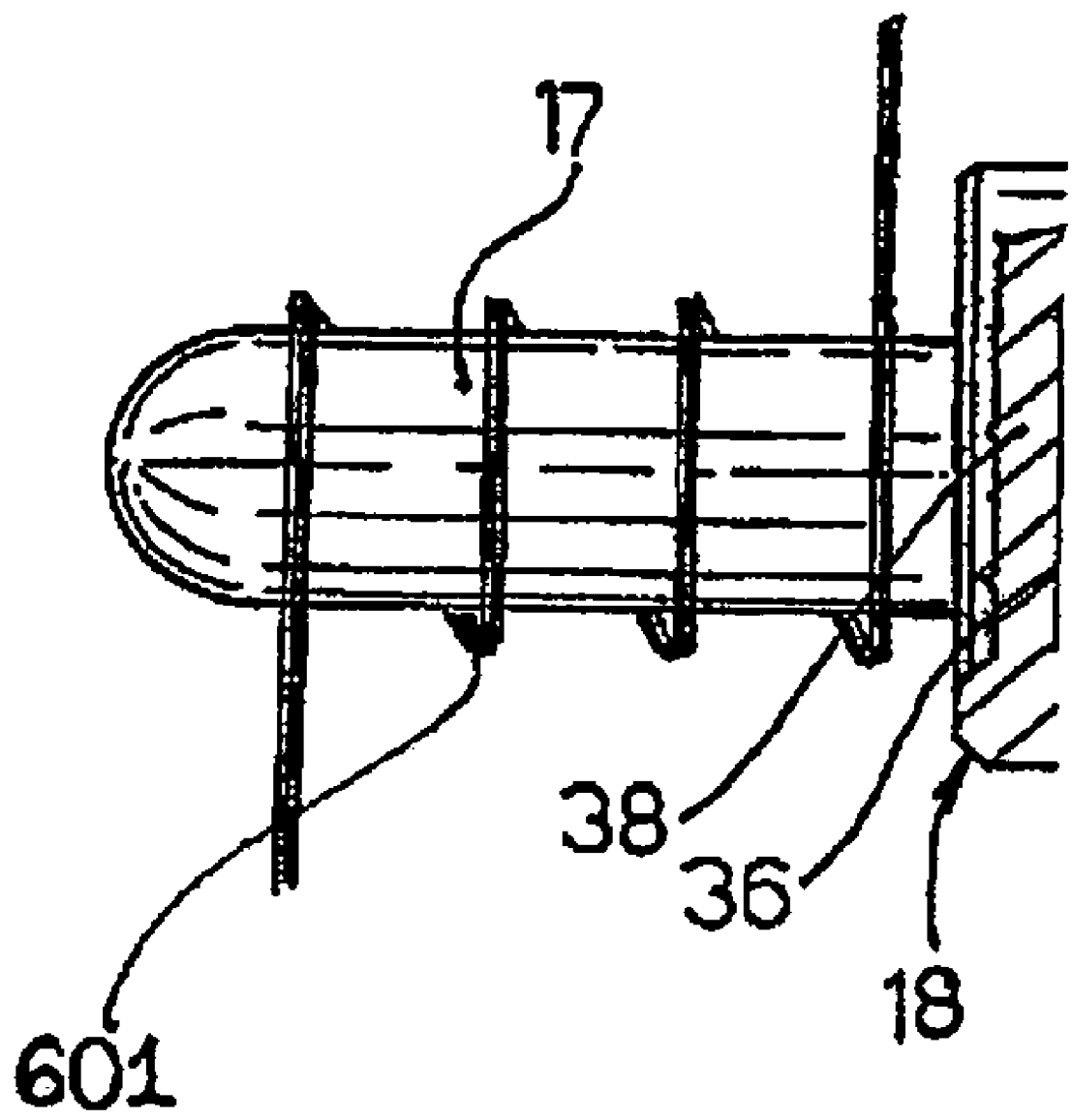

With reference to FIGS. 1 to 3, number 1 indicates as a whole a high-resistance decelerating device insertable in known manner between two members 2 and 3 movable relatively with respect to each other and only shown schematically by dash lines in FIG. 1 for the sake of simplicity.

In the non-limiting example shown, the two members 2 and 3 rotate relatively, so that decelerating device 1 described below provides for braking relative rotation. The principle of the invention, however, may be applied to braking any relative motion, e.g. even sliding motion, between two members between which the decelerating device according to the invention is insertable.

As shown in FIGS. 1 to 3, device 1 comprises a casing 4 defining internally a chamber 5 filled with a known viscous fluid 6 (FIG. 3), e.g. silicone oil; and a movable member 7 fitted in fluidtight manner to casing 4, so as to be housed at least partly inside chamber 5 and immersed in viscous fluid 6.

The principle of the invention lies in providing device 1 with a combination of:

partition means, indicated as a whole by 9, for dividing chamber 5 substantially in fluidtight manner into at least two adjacent portions 10 and 11 varying in volume as a function of the position of movable member 7 with respect to casing 4; and calibrated constriction means, indicated as a whole by 12, for maintaining permanent hydraulic connection of the two adjacent portions 10 and 11 of chamber 5, so that the viscous fluid 6 flows, with a given, relatively high resistance, between the two chamber portions 10, 11 as a consequence of the relative motion between movable member 7 and casing 4.

As explained more clearly later on, in the example shown, partition means 9 are designed to also act as supporting and guide means for movable member 7 inside chamber 5 of casing 4.

More specifically, in the non-limiting example shown of relatively rotating members 2 and 3, casing 4 is cup-shaped and of elongated, cylindrical axial symmetry like a cigarette; while movable member 7 is defined by a cylindrical pin, which is fitted idly to casing 4, is housed at least partly inside casing 4, clicks into an axially locked position inside casing 4, and is inserted through an open end 14 of casing 4.

Movable member 7 comprises an axial portion 15 housed idly in fluidtight manner inside chamber 5 to define a rotor immersed in viscous fluid 6 (FIG. 3) filling chamber 5; and an enlarged head 29 projecting from open end 14 of casing 4. Between axial portion 15 and head 29 of movable member 7 are interposed: a cylindrical stop surface 31 larger in diameter than portion 15 and such as to mate idly with a cylindrical inner lateral wall 24 of chamber 5, at open end 14 of casing 4; and a collar 33 which, when movable member 7 is assembled inside casing 4, clicks inside a corresponding groove of matching shape formed in cylindrical inner lateral wall 24 of chamber 5, at open end 14 of casing 4. Between cylindrical stop surface 31 and collar 33, a sealing ring 34 (FIG. 1) is inserted inside a seat on movable member 7, and cooperates with cylindrical inner lateral wall 24.

Head 29 and the end 18 of casing 4 opposite open end 14 have known means for angular connection to relatively rotating members 2 and 3, e.g. a radial tab or projection 19 on head 29, and a tangential faced or flat portion 20 (FIGS. 2 and 3) at end 18, so that, in use, movable member 7 and casing 4 are rotated relatively by members 2 and 3—casing 4 angularly integral with member 2 (e.g. a top-loaded washing machine drum), and movable member 7 angularly integral with member 3 (e.g. a swing door of said top-loaded washing machine drum).

Said partition means 9 comprise at least one radial rib 9a extending axially along the whole length of axial portion 15 of movable member 7, and so sized as to cooperate in sliding manner, in use, with cylindrical inner lateral wall 24 of chamber 5 of casing 4; and a saddle-shaped projection 26 extending along an angular portion of given size of inner lateral wall 24 of chamber 5 (FIG. 3). Projection 26 defines a cylindrically symmetrical seat, on which part of a cylindrical outer lateral wall 25 of axial portion 15 of movable member 7 rests and slides in use.

Movable member 7 is thus rotated inside chamber 5 in precise, balanced manner (largely on opposite sides) by rib 9a and projection 26, and on substantially continuous supports preventing (or at least greatly reducing) radial flexing of the pin.

Moreover, rib 9a and projection 26 divide chamber 5 in substantially fluidtight manner into adjacent chamber portions 10, 11; and saddle-shaped projection 26 interrupts the annular continuity of chamber 5, and prevents the viscous fluid 6 in the chamber from being rotated by the relative rotation between portion 15 of pin 7 and casing 4.

Projection 26 also acts as an angular stop for the rotation of movable member 7, by arresting axial rib 9 on opposite sides.

The end of axial portion 15 of movable member 7 opposite head 29 of pin 7 mates idly with and rests axially on casing 4 inside a cylindrical seat 36 defined by a recess formed inside chamber 5, in an end wall 38 of casing 4, and facing open end 14 of casing 4. Both the opposite ends and the intermediate portion of movable member 7 are therefore supported and guided, as stated, by casing 4 and by saddle-shaped projection 26 and rib 9a, regardless of the angular position of movable member 7 with respect to casing 4.

In a variation not shown for the sake of simplicity, device 1 may obviously comprise a number of radial ribs 9a in different angular positions, so as better to support movable member 7 as it rotates; in which case, chamber 5 is divided into more than two adjacent chamber portions, and in particular, in the case of n ribs 9, into n+1 adjacent chamber portions, at least two of which are always separated by projection 26.

Calibrated constriction means 12 comprise one or more annular grooves 12 (two in the example shown, though any number may be provided) interrupted by radial rib 9a and formed in cylindrical outer lateral wall 25 of axial portion 15 of movable member 7.

End 18 of casing 4 is preferably provided with an axially projecting pin 17 for supporting, in known manner a torsion 601 (FIG. 6) spring for producing, in given conditions, relative motion between members 2 and 3, e.g. the door-release spring of a top-loaded washing machine drum.

Device 1 as described is therefore fairly compact radially, and so much so as to be easily incorporated in a small-size hinge. At the same time, however, it is capable of producing considerable resistance, which is theoretically independent of the external size of the device, by depending solely on the viscosity of fluid 6 and on the size of the radial passages connecting chamber portions 10 and 11, and by projection 26 preventing fluid 6 from being simply rotated, with friction, by rotation of movable member 7 and the elements integral with it.

In the FIG. 4 variation, in which details similar to or identical with those already described are indicated using the same reference numbers, the calibrated constriction means according to the invention comprise at least one groove 112 formed, circumferentially with respect to the axis of symmetry of movable member 7, in a cylindrically symmetrical surface defining an end edge 113 of each rib 9a provided. In use, edge 113 cooperates in fluidtight manner with cylindrical inner lateral wall 24 of chamber 5, but the viscous fluid 6 moved by rotation of movable member 7, as a consequence of rib 9a, can still flow between chamber portions 10 and 11 along groove/s 112.

Similarly, in the FIG. 5 variation, grooves 12 or 112 are eliminated, and the calibrated constriction means comprise at least one hole 212 formed, circumferentially with respect to the axis of symmetry of movable member 7, through a root portion of rib 9a, closely adjacent to the cylindrical outer lateral wall 25 of axial portion 15 of movable member 7.

The Invention claimed is:

1. A decelerating device insertable between two members which are moveable relative to each other, said device comprising
a casing defining internally a chamber filled with a viscous fluid;
a movable member fitted in fluid-tight manner to the casing so as to be housed at least partly inside said chamber and immersed in the viscous fluid;
partition means for dividing the chamber, substantially in fluid-tight manner, into at least two adjacent portions varying in volume as a function of a relative position of the movable member with respect to the casing; and
calibrated constriction means for maintaining a permanent hydraulic connection of said at least two adjacent portions of the chamber, so that said viscous fluid flows, with a given resistance, between said at least two adjacent portions as a consequence of a relative motion between the movable member and the casing;
wherein
said casing is of elongated, cylindrical axial symmetry;
said movable member is defined by a cylindrical pin, which is fitted to the casing, is housed at least partly inside the casing, clicks into an axially locked position inside the casing, and is inserted through an open end of the casing;
said cylindrical pin comprises
an axial portion housed in fluid-tight manner inside said chamber of the casing to define a rotor immersed in said viscous fluid filling the chamber, and
a head projecting from said open end of the casing;
said partition means comprise
at least one radial rib extending along a whole length of said axial portion of the pin, and so sized as to cooperate in sliding manner, in use, with a cylindrical inner lateral wall of said chamber of the casing, and a saddle-shaped projection extending along an angular portion of a given size of said inner lateral wall of said chamber;

said projection defines a cylindrically symmetrical seat, on which a cylindrical outer lateral wall of said axial portion of the pin rests and slides in use, so that said at least one rib and said projection support and guide said pin inside said chamber;

a first end of said axial portion and said head of the pin are separated
by a cylindrical stop surface larger in diameter than the axial portion of the pin, and such as to mate with said cylindrical inner lateral wall of said chamber, at said open end of the casing; and
by a collar which clicks inside a groove formed in said cylindrical inner lateral wall of the chamber, at said open end of the casing;

said device further comprises, between said cylindrical stop surface and said collar, a sealing ring being inserted inside a seat on the pin, and cooperating with the cylindrical inner lateral wall of the chamber; and a second, opposite end of said axial portion is fitted and rests axially inside a cylindrical seat, which is defined by a recess formed in said chamber, in an end wall of said casing, and faces said open end of the casing.

2. The device as claimed in claim 1, wherein said head of the pin and said end wall of said casing opposite said open end of the casing have angular connecting elements for connection to said members, so that said pin and said casing are rotatable relatively by said members.

3. The device as claimed in claim 1, wherein said calibrated constriction means comprise at least one annular groove interrupted by said radial rib and formed in said cylindrical outer lateral wall of the axial portion of the pin.

4. The device as claimed in claim 1, wherein said calibrated constriction means comprise at least one groove formed, circumferentially with respect to the axis of symmetry of said pin, in a cylindrical surface defining an end face of said radial rib cooperating, in use, with said cylindrical inner lateral wall of the chamber.

5. The device as claimed in claim 1, wherein said calibrated constriction means comprise at least one hole formed, circumferentially with respect to the axis of symmetry of said pin, through a root portion of said radial rib, closely adjacent to said cylindrical outer lateral wall of the axial portion of the pin.

6. The device as claimed in claim 1, wherein said projection also acts as an angular stop for the rotation of said pin, by arresting said at least one radial rib of the pin on opposite sides.

7. The device as claimed in claim 1, wherein, at said end wall, said casing has an axially projecting pin for receiving, in use, a torsion spring.

8. A decelerating device, comprising:
a casing having a chamber therein;
a viscous fluid filled in said chamber;
a moveable member at least partly received inside said chamber and immersed in the viscous fluid, said moveable member being rotatable about an axis thereof relative to said casing;
an axial ridge extending radially outwardly from an outer surface of said moveable member and being in sliding contact with an inner wall of said chamber;
an axial projection extending radially inwardly from said inner wall of said chamber and being in sliding contact with said outer surface of said moveable member;
said ridge and said projection together dividing the chamber into at least two subchambers having volumes varying depending on a relative position of said ridge carried by said moveable member with respect to said projection carried by said casing; and
a channel providing a permanent hydraulic connection between said subchambers so as to allow said viscous fluid to flow between said subchambers as a result of a relative motion between the movable member and the casing, wherein said channel is a circumferential groove formed in the outer surface of said moveable member and said channel is interrupted by said ridge.

9. The device of claim 8, wherein
said ridge has a top face in sliding contact with the inner surface of said chamber, and opposite side faces connecting the top face with the outer surface of said moveable member; and
said channel extends continuously from one of the side faces to the other.

10. The device of claim 9, comprising multiple said channels axially spaced.

11. The device of claim 9, wherein
said projection has a top face in sliding contact with the outer surface of said moveable member, and opposite side faces connecting the top face of said projection to the inner surface of aid chamber; and
the outer surface of said moveable member, the inner surface of said chamber, the top faces of said ridge and said projection are cylindrical.

12. The device of claim 9, wherein
said projection has a top face in sliding contact with the outer surface of said moveable member, and opposite side faces connecting the top face of said projection to the inner surface of said chamber; and
said side faces of said projection define two stops for said ridge in the relative motion of the movable member and the casing.

13. The device of claim 8, wherein said channel provides the permanent hydraulic connection between said subchambers regardless of the relative position of said ridge with respect to said projection.

14. The device of claim 13, wherein
said ridge has a top face in sliding contact with the inner surface of said chamber, and opposite side faces connecting the top face with the outer surface of said moveable member; and
said channel extends continuously from one of the side faces to the other.

15. The device of claim 8, wherein said channel and said ridge collectively extend for full 360 degrees circumferentially of said moveable member.

16. The device of claim 15, wherein
said ridge has a top face in sliding contact with the inner surface of said chamber, and opposite side faces connecting the top face with the outer surface of said moveable member; and
said channel extends continuously between and terminates at said side faces.

17. The device of claim 8, wherein
said projection has a top face in sliding contact with the outer surface of said moveable member, and opposite side faces connecting the top face of said projection to the inner surface of said chamber;

said side faces of said projection define two stops for said ridge in the relative motion of the movable member and the casing; and said channel continuously extends over an entire circumferential extent of said top face of said projection at all times, regardless of the relative position of said ridge with respect to said projection.

18. The device of claim 17, wherein said ridge has a top face in sliding contact with the inner surface of said chamber, and opposite side faces connecting the top face with the outer surface of said moveable member; and said channel extends continuously between and terminates at said side faces of said ridge.

* * * * *